United States Patent
Jiang et al.

(10) Patent No.: US 10,354,111 B2
(45) Date of Patent: Jul. 16, 2019

(54) PRIMARY LOCALIZATION METHOD AND SYSTEM FOR QR CODES

(71) Applicant: FUJIAN LANDI COMMERCIAL EQUIPMENT CO., LTD., Fuzhou, Fujian (CN)

(72) Inventors: Shengzhang Jiang, Fujian (CN); Weidong Wu, Fujian (CN)

(73) Assignee: FUJIAN LANDI COMMERCIAL EQUIPMENT CO., LTD., Fuzhou (CN)

( * ) Notice: Subject to any disclaimer, the term of this patent is extended or adjusted under 35 U.S.C. 154(b) by 20 days.

(21) Appl. No.: 15/895,227

(22) Filed: Feb. 13, 2018

(65) Prior Publication Data
US 2018/0173918 A1 Jun. 21, 2018

Related U.S. Application Data (63) Continuation of application No. PCT/CN2016/091970, filed on Jul. 28, 2016.

(30) Foreign Application Priority Data

Sep. 2, 2015 (CN) .......................... 2015 1 0553209

(51) Int. Cl.
G06K 7/14 (2006.01)
G06K 7/10 (2006.01)
(52) U.S. Cl.
CPC ............. G06K 7/1417 (2013.01); G06K 7/10 (2013.01); G06K 7/10722 (2013.01)
(58) Field of Classification Search
CPC ..... G06K 7/1417; G06K 7/10; G06K 7/10722

USPC .......................................... 235/462.09, 462.1
See application file for complete search history.

(56) References Cited

U.S. PATENT DOCUMENTS

| | | | | |
|---|---|---|---|---|
| 2004/0020989 | A1* | 2/2004 | Muramatsu | G06K 19/06037 235/462.1 |
| 2007/0071320 | A1* | 3/2007 | Yada | G06K 7/14 382/181 |
| 2007/0295814 | A1* | 12/2007 | Tanaka | G06K 7/10722 235/454 |
| 2011/0290882 | A1* | 12/2011 | Gu | G06K 7/1456 235/462.11 |
| 2016/0125214 | A1* | 5/2016 | Huang | G06K 7/10811 235/462.11 |

(Continued)

FOREIGN PATENT DOCUMENTS

CN 104298947 A 1/2015

*Primary Examiner* — Paultep Savusdiphol (57) ABSTRACT

A primary localization method for QR codes comprises: S1, binarizing pixel points of a received image containing a QR code; S2, partitioning the image into at least one mesh region; S3, recording the number of black pixel points in each mesh region, assigning the value 1 to mesh regions including black points, and assigning the value 0 to mesh regions not including black points; S4, marking the image as a non-object region; S5, scanning the non-object region line-by-line and column by column and marking the union of the mesh regions continuously with the value 1 for the first time in each line and the mesh regions continuously with the value 1 for the first time in each column as an object region; S6, judging whether the object region is the QR code region, if not, returning to step S5, and if yes, outputting the line numbers and the column numbers.

7 Claims, 4 Drawing Sheets

(56) References Cited

U.S. PATENT DOCUMENTS

2017/0140191 A1* 5/2017 Tanabe ............... G06K 7/10762

* cited by examiner

PRIMARY LOCALIZATION METHOD AND SYSTEM FOR QR CODES

CROSS REFERENCE TO RELATED APPLICATIONS

The present application is a Continuation Application of PCT Application No. PCT/CN2016/091970 filed on Jul. 28, 2016, which claims the benefit of Chinese Patent Application No. 201510553209.5 filed on Sep. 2, 2015. All the above are hereby incorporated by reference.

TECHNICAL FIELD

The invention relates to the technical field of recognition of QR codes, in particular to a primary localization method and system for QR codes.

DESCRIPTION OF RELATED ART

QR codes are used more and more widely, and the requirement for the QR code image processing capacity becomes higher and higher. Generally, a QR code image includes an object region and a background region, the QR code is located in the object region, and thus if the object region can be localized rapidly, the image recognition speed can be greatly increased. However, the object region is generally disturbed by the background region to a certain extent, and thus is of great importance to effectively filter out the disturbance to the object region from the background region.

At present, the method of scanning QR code image data line-by-line is mainly used to search for key characteristics, and the position of the object region is then found according to the key characteristics; however, the characteristic judgment process is generally time-consuming, part of data in non-object regions are searched for through the method, and consequentially, efficiency is reduced. The Chinese invention patent with the application No. CN104298947A discloses an accurate localization method and device for QR codes, wherein the accurate localization method comprises the steps of primarily localizing the QR code region after the QR code image acquired by an image sensor is binarized, and then carrying out traversal scanning on the primarily-localized QR code region twice, so that four vertexes of the QR code are obtained to achieve accurate localization. For the step of primarily localizing the QR code region, traversal scanning is carried out on the binarized QR code image, the horizontal region where the QR code is located is localized firstly, and then the vertical region where the QR code is located is localized. As for the method for localizing the horizontal region, the number of changes from black to white and from white to black is recorded with change arrays, then elements in the change arrays are ranked through the heap algorithm, the elements, ranked ahead of the height threshold of the QR code, in the change array are extracted, the elements, racked ahead of the height threshold constant of the QR code, in the line array are ranked, and when it is judged that the distance between two lines is within the width range of one QR code module and located in the QR code region, the line numbers of the two lines are recorded. The data calculation quantity is large, if the QR code image rotates, the corner characteristics of the QR code region are likely to be filtered out when the lines of the QR code are screened according to the height threshold value of the QR code, and consequentially, normal decoding of the QR code is affected.

TECHNICAL PROBLEMS

To solve the above technical problems, the invention provides a primary localization method and system for QR codes, which are high in speed and efficiency.

TECHNICAL SOLUTION TO PROBLEMS

Technical Solution

The technical scheme adopted by the invention to solve the above technical problems:

A primary localization method for QR codes comprises the following steps:

S1, binarizing pixel points of a received image containing a QR code;

S2, partitioning the received image containing the QR code into at least one mesh region including m*n pixel points;

S3, recording the number of black pixel points in each mesh region, assigning the value 1 to the mesh region if the number of the black pixel points in the mesh region is greater than 0, otherwise, assigning the value 0 to the mesh region;

S4, marking the image containing the QR code as a non-object region after values are assigned to the mesh regions;

S5, scanning the non-object region from top to bottom line-by-line as well as from left to right column by column, marking the union of the mesh regions continuously with the value 1 for the first time in each line and the mesh regions continuously with the value 1 for the first time in each column as an object region, and marking the union of other regions as a non-object region;

S6, recoding the number of mesh regions and the number of pixel points in the length direction of the object region, the number of mesh regions and the number of pixel points in the width direction of the object region and the number of mesh regions with the value 1 in the object region, and judging whether the object region is the QR code region or not;

if the object region is not the QR code region, returning to step S5 to perform corresponding operation again;

if the object region is the QR code region, outputting the line numbers and the column numbers of the pixel points corresponding to the boundaries of the object region.

Beneficial effects of the invention: the received image containing the QR code is divided into at least one mesh region including m*n pixel points, and if the values of m and n are reasonably set, except the central region used for accommodating a logo, mesh regions in the functional region and the coding region of the QR code all include black points. The larger the product of m and n is, the higher the primary localization speed of the QR code region, otherwise, the lower the primary localization speed of the QR code region is; and the smaller the difference between m and n is, the more conveniently the QR code region can be determined. The value 1 is assigned to the mesh regions including black points, the value 0 is assigned to the mesh regions not including black points, and thus the mesh regions in the function region and the coding region of the QR code are all marked as 1. The lines continuously with the value 1 and the columns continuously with the value 1 are searched out from the image containing the QR code and form an object region regarded as a possible QR code region. However, besides the QR code region, the background region of the received image containing the QR code also possibly includes a large area of continuous black points, and thus whether the marked-out object region is the QR code region or not needs to be judged; if not, the non-object region continues to be researched for the QR code region; and if yes, the line numbers and column numbers of the pixel points in the object region are output. According to the method, the pattern characteristics of the QR code are fully used to primarily localize the line numbers and the column numbers of the pixel points in the QR code region in the image containing the QR code, and thus the QR code region is localized rapidly and effectively.

A primary localization system for QR codes comprises a binarization module, a partition module, a first recording module, an assignment module, a first marking module, a scanning module, a second marking module, a second recording module, a judgment module and an output module, wherein the binarization module is used for binarizing the pixel points of a received image containing a QR code;

the partition module is used for partitioning the received image containing the QR code into at least one mesh region including m*n pixel points;

the first recording module is used for recoding the number of black pixel points in each mesh region;

the assignment module is used for assigning the value 1 or 0 to the mesh regions;

the first marking module is used for marking the image containing the QR code as a non-object region after the values are assigned to the mesh regions;

the scanning module is used for scanning the non-object region from top to bottom line-by-line and scanning the non-object region from left to right column by column;

the second marking module is used for marking the union of the mesh regions continuously with the value 1 for the first time in each line and the mesh regions continuously with the value 1 for the first time in each column as an object region and marking the union of other regions as a non-object region;

the second recording module is used for recording the number of mesh regions and the number of pixel points in the length direction of the object region, the number of mesh regions and the number of pixel points in the width direction of the object region and the number of mesh regions with the value 1 in the object region;

the judgment module is used for judging whether the object region is the QR code region or not;

the output module is used for outputting the line numbers and the column numbers of the pixel points corresponding to the boundaries of the object region.

BENEFICIAL EFFECTS OF THE INVENTION

Beneficial Effects

Beneficial effects of the invention: the QR code region is partitioned into the mesh regions including m*n pixel points, based on the characteristic that most meshes in the QR code region include black points, the value 1 is assigned to the mesh regions including black points, the value 0 is assigned to the mesh regions not including black points, and then the received image containing the QR code is searched for the object region. In this way, whether the object region is the QR code region or not can be judged without being disturbed by the background color, and rapid primary localization of the QR code region is effectively ensured.

DESCRIPTION OF THE REFERENCE SIGNS 1, binarization module; 2, partition module; 3, first recording module; 4, assignment module; 5, first marking module; 6, scanning module; 7, second marking module; 8, second recording module; 9, judgment module; 10, output module;

111, non-object region; 112, object region;

120, non-object region; 121, object region; 122, non-object region;

13, QR code region.

EMBODIMENTS OF THE INVENTION

Detailed Description of the Invention

The key concept of the invention: based on the characteristics that after a QR code image is partitioned into mesh regions according to a certain width, each mesh region includes black points, but the pattern, a certain distance away, around the QR code includes white points only, the received image containing a QR code is searched for the QR code region, and thus the method is rapid and accurate.

Figure 1:
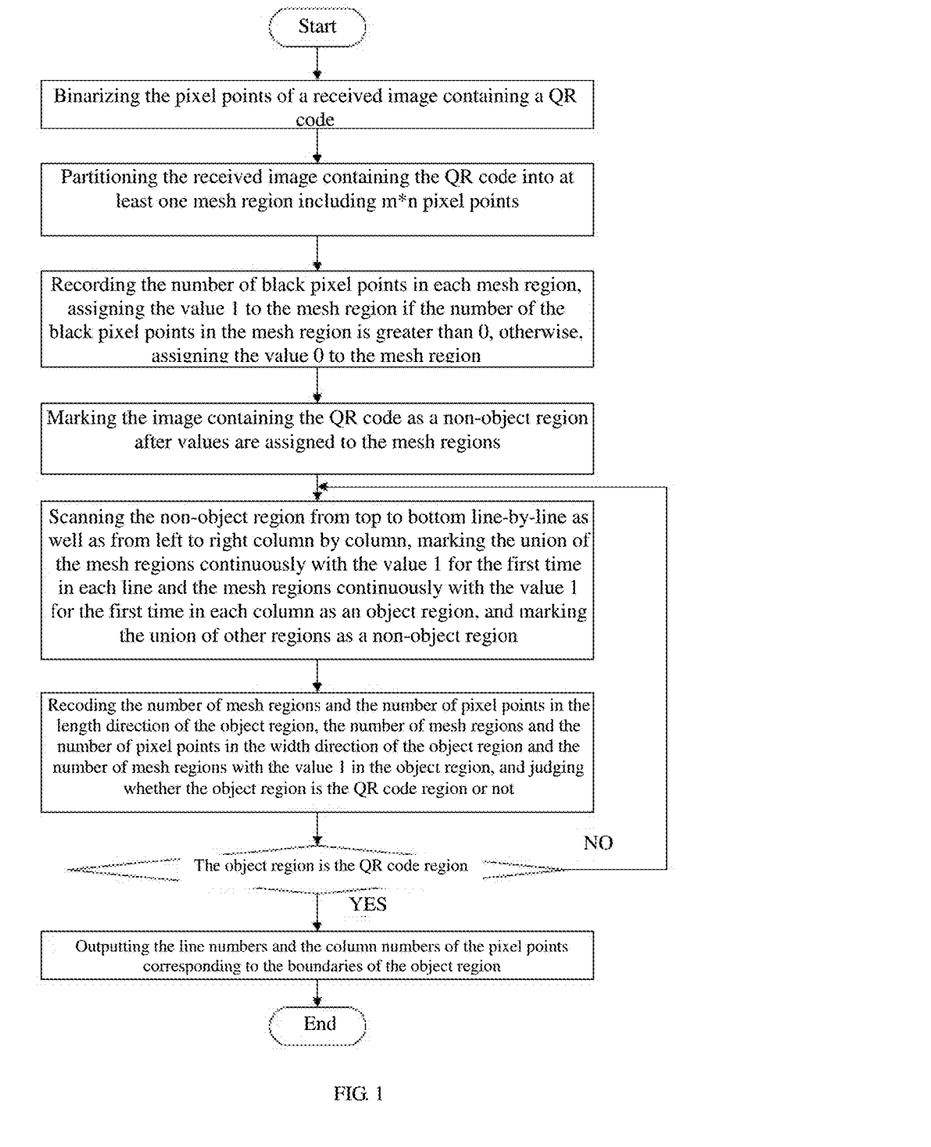
FIG. 1 is a flow diagram of a primary localization method for QR codes in the first embodiment of the invention.

As is shown in FIGS. 1-6, the detailed description of the invention:

A primary localization method for QR codes comprises the following steps:

S1, binarizing the pixel points of a received image containing a QR code;

S2, partitioning the received image containing the QR code into at least one mesh region including m*n pixel points;

S3, recording the number of black pixel points in each mesh region, assigning the value 1 to the mesh region if the number of the black pixel points in the mesh region is greater than 0, otherwise, assigning the value 0 to the mesh region;

S4, marking the image containing the QR code as a non-object region after values are assigned to the mesh regions;

S5, scanning the non-object region from top to bottom line-by-line as well as from left to right column by column, marking the union of the mesh regions continuously with the value 1 for the first time in each line and the mesh regions continuously with the value 1 for the first time in each column as an object region, and marking the union of other regions as a non-object region;

S6, recoding the number of mesh regions and the number of pixel points in the length direction of the object region, the number of mesh regions and the number of pixel points in the width direction of the object region and the number of mesh regions with the value 1 in the object region, and judging whether the object region is the QR code region or not;

if the object region is not the QR code region, returning to step S5 to perform corresponding operation again;

if the object region is the QR code region, outputting the line numbers and the column numbers of the pixel points corresponding to the boundaries of the object region.

Furthermore, in step S5, the non-object region is scanned from top to bottom, line-by-line and also scanned from left to right column by column, the union of the mesh regions continuously with the value 1 for the first time in each line and the mesh regions continuously with the value 1 for the first time in each column is marked as an object region, and the union of other mesh regions is marked as a non-object region, specifically, the non-object region is scanned from top to bottom line-by-line, and the mesh regions continuously with the value 1 for the first time in each line are marked as object regions:

the first mesh region with the value 1 in each line is marked as an object line region, and the mesh region ahead of the first mesh region with the value 1 is marked as a non-object line region; if the mesh region ahead of the current mesh region is marked as an object line region and the value of the current mesh region is 1, the current mesh region is marked as a line object region, otherwise, the current mesh region is marked as a non-object line region;

the non-object region is scanned from left to right column by column, and the mesh regions continuously with the value 1 for the first time in each column are marked as object regions;

the first mesh region with the value 1 in each column is marked as an object column region, and the mesh region ahead of the first mesh region with the value 1 is marked as a non-object column region; if the mesh region ahead of the current mesh region is marked as an object column region and the value of the current mesh region is 1, the current mesh region is marked as an object column region, otherwise, the current mesh region is marked as a non-object column region;

the union of the object line regions and the object column regions forms the object region.

From the above description, the image containing the QR code is partitioned into the mesh regions including $m*n$ pixel points, although not all the mesh regions include black points, the mesh regions including black points are continuous in lines or columns, on this basis, when the object region is marked, the whole image is scanned line-by-line and column by column, the union of the search-out object line regions and the searched-out object column regions is used as the object region, and the maximum area of the object region is a possible QR code region. In this way, the influence of mesh regions with the value 0 in lines or columns on the range of the whole QR code region is eliminated, omission of mesh regions is avoided, and the integrity of the primarily-localized QR code region is effectively ensured.

Furthermore, in step S6, whether the object region is the QR code region or not is judged, specifically, the number N of mesh regions with the value 1 in the object region is recorded;

the number W of mesh regions and the number $W*n$ of pixel points in the length direction of the object region are recorded;

the number H of mesh regions and the number $H*m$ of pixel points in the width direction of the object region are recorded;

the pixel point difference threshold d is preset, if $N*2<W*H$ or $|(W*n)-(H*m)|>d$, it indicates that the object region is not the QR code region, otherwise, it indicates that the object region is the QR code region.

From the above description, the characteristic that the QR code region is approximate to a square and the number of the mesh regions with the value 1 is greater than half of the total number of the mesh regions in the whole QR code region is fully used to judge whether the object region is the QR code region is not, and thus the object region needs to meet the condition $N*2<W*H$ and the condition $|(W*n)-(H*m)|>d$. The smaller the difference between m and n is, the smaller the difference between the length W and the width H of the object region, the smaller the value of $|(W*n)-(H*m)|$, the smaller the value of d can be, accordingly, the higher the similarity between the localized QR code region and the QR code region is, and the higher the precision is.

Furthermore, in step S6, if the object region is the QR code region, whether the size of the object region meets the decoding condition or not is judged, specifically, the minimum pixel point threshold is preset, if the number of pixel points in the length direction of the object region is smaller than the minimum pixel point threshold, or the number of pixel points in the width direction of the object region is smaller than the minimum pixel point threshold, it indicates that the object region is too small and does not meet the decoding condition.

Furthermore, the minimum pixel point threshold is 21.

From the above description, if the searched-out object region is too small, even if the object region is the QR code region, the QR code cannot be accurately decoded easily, so that if the object region is too small and cannot meet the decoding condition, the QR code is not decoded anymore. As the smallest QR code includes 21 data bits in the length direction and the width direction, if each data bit includes only one pixel point, the smallest QR code includes 21 pixel points in the length direction and the width direction, and thus the minimum pixel point threshold is set as 21. Therefore, the method is reasonable, and the decoding validity of the QR code is ensured.

Furthermore, in step S6, if the object region is the QR code region, the line numbers and the column numbers of the pixel points corresponding to the boundaries of the object region are output, specifically, the line numbers and the column numbers of the mesh regions in the object region are recorded;

according to the line numbers and the column numbers of the mesh regions in the object region and the characteristic that each mesh region includes $m*n$ pixel points, the line numbers and the column numbers of the pixel points corresponding to the boundaries of the object region are obtained through calculation.

From the above description, according to the line numbers and the column numbers of the mesh regions and the characteristic that each mesh region includes m*n pixel points, the line numbers and the column numbers of the pixel points corresponding to the boundaries of the object region can be directly worked out through multiplication, the line numbers and the column numbers of the pixel points in the object region can be figured out, in this way, the QR code can be decoded conveniently, and the method is reasonable.

Figure 2:
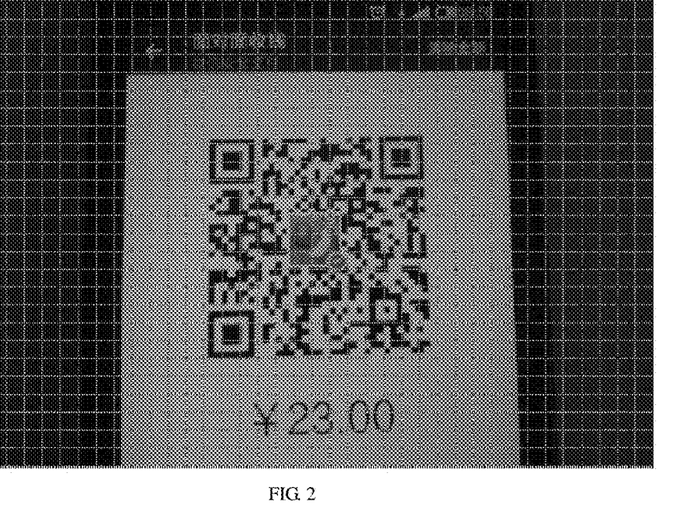
FIG. 2 is a diagram of an image containing a QR code after the image is partitioned into mesh regions in the first embodiment of the invention.
Figure 3:
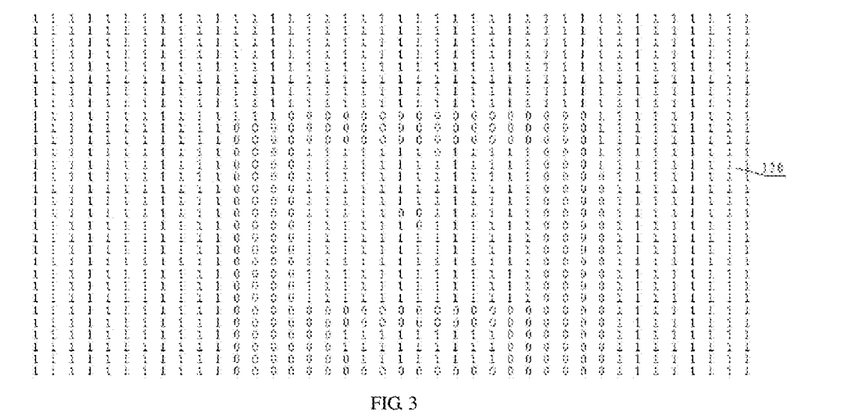
FIG. 3 is a diagram of the image containing the QR code after the image is partitioned into mesh regions and values are assigned to the mesh regions in the first embodiment of the invention.
Figure 4:
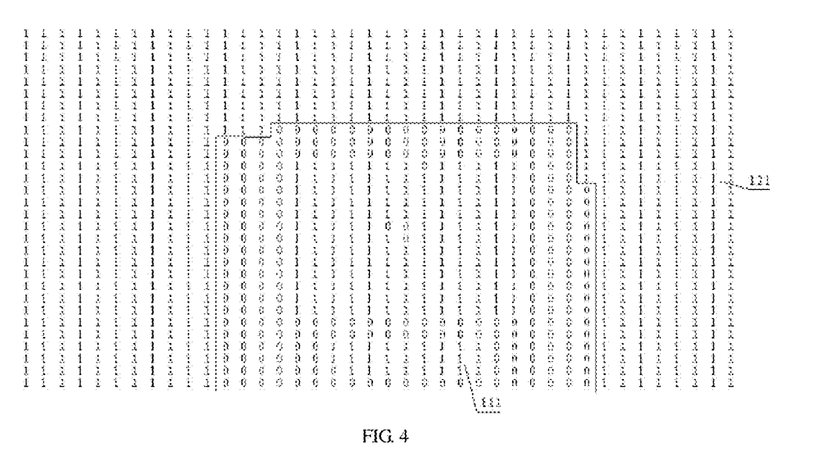
FIG. 4 is a diagram of an object region and a non-object region marked out after the image containing the QR code is scanned in the first embodiment of the invention.
Figure 5:
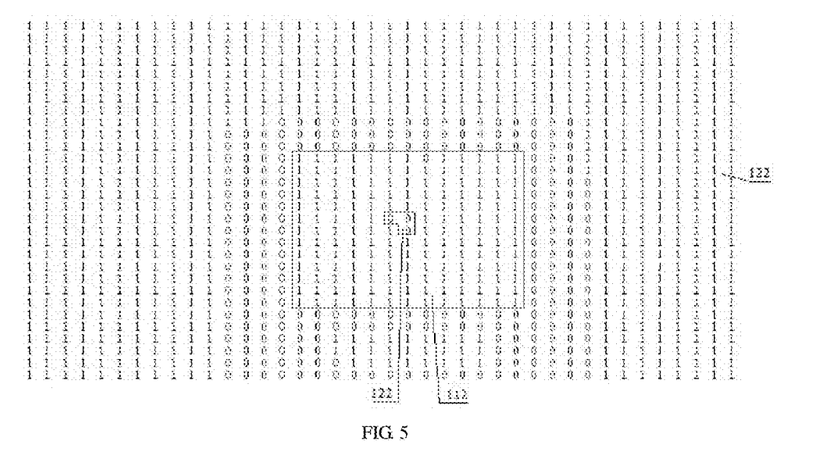
FIG. 5 is a diagram of an object region and a non-object region marked out after the non-object region in FIG. 4 is scanned in the first embodiment of the invention.

As is shown in FIGS. 1-6, as for the first embodiment of the invention:

A primary localization method for QR codes comprises the following steps:

S1, binarizing the pixel points of a received image containing a QR code;

S2, as is shown in FIG. 2, partitioning the received image containing the QR code into at least one mesh region including m*n pixel points, wherein m=n=16;

S3, as is shown in FIG. 3, recording the number of black pixel points in each mesh region, assigning the value 1 to the mesh region if the number of the black pixel points in the mesh region is greater than 0, otherwise, assigning the value 0 to the mesh region;

S4, marking the image containing the QR code as a non-object region 120 after values are assigned to the mesh regions;

S5, scanning the non-object region 120 in FIG. 3 from top to bottom line-by-line as well as from left to right column by column, marking the union of the mesh regions continuously with the value 1 for the first time in each line and the mesh regions continuously with the value 1 for the first time in each column as an object region 121, and marking the union of other mesh regions as a non-object region 111, as is shown in FIG. 4, specifically, the non-object region 120 in FIG. 3 is scanned from top to bottom line-by-line, and the mesh regions continuously with the value 1 for the first time in each line are marked as object regions:

the first mesh region with the value 1 in each line is marked as an object line region, and the mesh region ahead of the first mesh region with the value 1 is marked as a non-object line region; if the mesh region ahead of the current mesh region is marked as an object line region and the value of the current mesh region is 1, the current mesh region is marked as a line object region, otherwise, the current mesh region is marked as a non-object line region;

the non-object region 120 in FIG. 3 is scanned from left to right column by column, and the mesh regions continuously with the value 1 for the first time in each column are marked as object regions;

the first mesh region with the value 1 in each column is marked as an object column region, and the mesh region ahead of the first mesh region with the value 1 is marked as a non-object column region; if the mesh region ahead of the current mesh region is marked as an object column region and the value of the current mesh region is 1, the current mesh region is marked as an object column region, otherwise, the current mesh region is marked as a non-object column region;

the union of the object line regions and the object column regions forms the object region 121, as is shown in FIG. 4, the length of the obtained object region 121 is the overall length of the image containing the QR code, and the width of the obtained object region 121 is the overall width of the image containing the QR code;

S6, recording the number of mesh regions and the number of pixel points in the length direction of the object region 121 in FIG. 4, the number of the mesh regions and the number of pixel points in the width direction of the object region 121 and the number of mesh regions with the value 1 in the object region 121, and judging whether the object region 121 is the QR code region is not, specifically, the number N of mesh regions with the value 1 in the object region 121 is recorded;

the number W of mesh regions and the number W*n of pixel points in the length direction of the object region 121 are recorded;

the number H of mesh regions and the number H*m of pixel points in the width direction of the object region 121 are recorded;

the pixel point difference threshold d, namely the number of pixel points included in the side length of each mesh region, is preset as 16, if N*2<W*H or |(W*n)−(H*m)|>d, it indicates that the object region is not the QR code region, otherwise, it indicates that the object region is the QR code region;

in this case, obviously, the object region 121 in FIG. 4 meets the condition |(W*n)−(H*m)|>d, therefore, the object region 121 is not the QR region, and the step S5 is performed again;

S5, scanning the non-object region 111 in FIG. 4 from top to bottom line-by-line as well as from left to right column by column, marking the union of the mesh regions continuously with the value 1 for the first time in each line and the mesh regions continuously with the value 1 for the first time in each column as the object region 112, and marking the union of other mesh regions as a non-object region 122, as is shown in FIG. 5, specifically, the non-object region 111 in FIG. 4 is scanned from top to bottom line-by-line, and the mesh regions continuously with the value 1 for the first time in each line are marked as object regions;

the first mesh region with the value 1 in each line is marked as an object line region, and the mesh region ahead of the first mesh region with the value 1 is marked as a non-object line region; if the mesh region ahead of the current mesh region is marked as the object line region and the value of the current mesh region is 1, the current mesh region is marked as an object line region, otherwise, the current mesh region is marked as a non-object line mesh region;

the non-object region 111 in FIG. 4 is scanned from left to right column by column, and the mesh regions continuously with the value 1 for the first time in each line are marked as object regions;

the first mesh region with the value 1 in each column is marked as a column object region, and the mesh region ahead of the first mesh region with the value 1 is marked as a non-object column region; if the mesh region ahead of the current mesh region is marked as an object column region and the value of the current mesh region is 1, the current mesh region is marked as an object column region, otherwise, the current mesh region is marked as non-object column region;

the union of the object line regions and the object column regions forms the object region 112, and the union of other mesh regions forms the non-object region 122, as is shown in FIG. 5;

S6, recording the number of pixel points in the length direction of the object region 112 in FIG. 5, the number of pixel points in the width direction of the object region 112 and the number of the mesh regions with the value 1 in the object region 112, and judging whether the object region 112 is the QR code region or not, specifically, the number N of the mesh regions with the value 1 in the object region 112 is recorded;

the number W of mesh regions and the number W*n of pixel points in the length direction of the object region 112 are recoded;

the number H of mesh regions and the number H*m of pixel points in the width direction of the object region 112 are recorded;

the pixel point difference threshold d, namely the number of pixel points included in the side length of each mesh region, is preset as 16, if N*2<W*H or |(W*n)−(H*m)|>d, it indicates that the object region is not the QR code region, otherwise, it indicates that the object region is the QR code region;

in this case, obviously, the object region 112 in FIG. 5 does not meet the condition N*2<W*H or |(W*n)−(H*m)|>d, and thus the object region 112 in FIG. 5 is the QR region 13.

Figure 6:
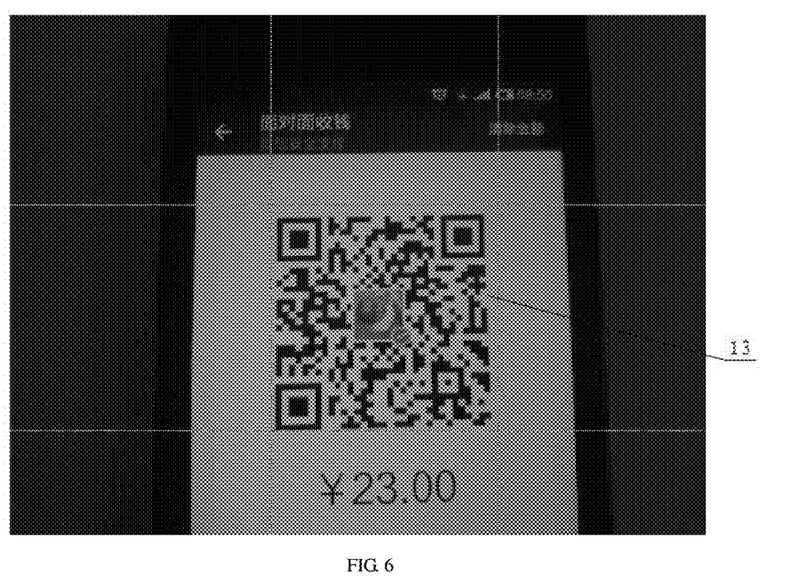
FIG. 6 is an image diagram of the image containing the QR code region corresponding to the object region in FIG. 5 in the first embodiment of the invention.

If the object region 112 is the QR code region 13, the line numbers and the column numbers of the pixel points corresponding to the boundaries of the object region are output, specifically, the line numbers and the column numbers of the mesh regions in the object region 112 are recorded;

according to the line numbers and the column numbers of the mesh regions in the object region 112 and the characteristic that each mesh region includes m*n pixel points, the line numbers and the column numbers of the pixel points corresponding to the four boundaries of the object region 112 are obtained through calculation, namely the pixel point corresponding to the left boundary is located in the 16th line and the 16th column, the pixel point corresponding to the right boundary is located in the 29th line and 16th column, the pixel point corresponding to the upper boundary is located in the 20th column and the 16th line, and the pixel point corresponding to the lower boundary is located in the 7th column and the 16th line, and thus the QR code is localized primarily, as is shown in FIG. 6.

Furthermore, in step S6, if the object region 112 is the QR code region 13, whether the size of the object region 112 meets the decoding condition or not is judged, specifically, the minimum pixel point threshold is preset as 21, if the number of pixel points in the length direction of the object region 112 is smaller than the minimum pixel point threshold, or the number of pixel points in the width direction of the object region 112 is smaller than the minimum pixel point threshold, it indicates that the object region 112 is too small and does not meet the decoding condition.

Figure 7:
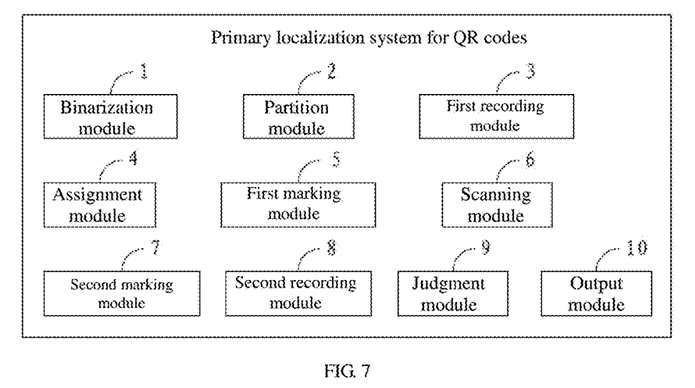
FIG. 7 is a structural block diagram of a primary localization system for QR codes in the second embodiment of the invention.

As is shown in FIG. 7, a primary localization system for QR codes comprises a binarization module 1, a partition module 2, a first recording module 3, an assignment module 4, a first marking module 5, a scanning module 6, a second marking module 7, a second recording module 8, a judgment module 9 and an output module 10, wherein the binarization module 1 is used for binarizing the pixel points of a received image containing a QR code;

the partition module 2 is used for partitioning the received image containing the QR code into at least one mesh region including m*n pixel points;

the first recording module 3 is used for recoding the number of black points in each mesh region;

the assignment module 4 is used for assigning the value 1 or 0 to the mesh regions;

the first marking module 5 is used for marking the image containing the QR code as a non-object region after the values are assigned to the mesh regions;

the scanning module 6 is used for scanning the non-object region from top to bottom line-by-line and scanning the non-object region from left to right column by column;

the second marking module 7 is used for marking the union of the mesh regions continuously with the value 1 for the first time in each line and the mesh regions continuously with the value 1 for the first time in each column as an object region and marking the union of other regions as a non-object region;

the second recording module 8 is used for recording the number of mesh regions and the number of pixel points in the length direction of the object region, the number of mesh regions and the number of pixel points in the width direction of the object region and the number of mesh regions with the value 1 in the object region;

the judgment module 9 is used for judging whether the object region is the QR code region or not;

the output module 10 is used for outputting the line numbers and the column numbers of the pixel points corresponding to the boundaries of the object region.

As is shown in FIG. 7, as for the second embodiment of the invention:

A primary localization system for QR codes comprises a binarization module 1, a partition module 2, a first recording module 3, an assignment module 4, a first marking module 5, a scanning module 6, a second marking module 7, a second recording module 8, a judgment module 9 and an output module 10, wherein the binarization module 1 is used for binarizing the pixel points of a received image containing a QR code;

the partition module 2 is used for partitioning the received image containing the QR code into at least one mesh region including m*n pixel points;

the first recording module 3 is used for recoding the number of black points in each mesh region;

the assignment module 4 is used for assigning the value 1 or 0 to the mesh regions;

the first marking module 5 is used for marking the image containing the QR code as a non-object region after values are assigned to the mesh regions;

the scanning module 6 is used for scanning the non-object region from top to bottom line-by-line and scanning the non-object region from left to right column by column;

the second marking module 7 is used for marking the union of the mesh regions continuously with the value 1 for the first time in each line and the mesh regions continuously with the value 1 for the first time in each column as an object region and marking the union of other regions as a non-object region;

the second recording module 8 is used for recording the number of mesh regions and the number of pixel points in the length direction of the object region, the number of mesh regions and the number of pixel points in the width direction of the object region and the number of mesh regions with the value 1 in the object region;

the judgment module 9 is used for judging whether the object region is the QR code region or not;

the output module 10 is used for outputting the line numbers and the column numbers of the pixel points corresponding to the boundaries of the object region.

In conclusion, according to the primary localization method and system of the invention, the QR code region is partitioned into the mesh regions each including m*n pixel points, the value 1 is assigned to the mesh regions including black points, the value 0 is assigned to the mesh regions not including black regions, in this way, the QR code region includes mesh regions continuously with the value 1 in lines and columns, the number of the mesh regions with the value 1 is greater than half of the total number of the mesh regions in the QR code region, and then whether the object region is the QR code region or not is judged based on the characteristic that the number of pixel points in the length direction of the QR code region is approximate to the number of the pixel points in the width direction of the QR code region. By adoption of the primary localization method and system, the QR code region can be primarily localized rapidly and accurately.

What is claimed is:

1. A primary localization method for QR codes, characterized by comprising the following steps:
   S1, binarizing the pixel points of a received image containing a QR code;
   S2, partitioning the received image containing the QR code into at least one mesh region including m*n pixel points;
   S3, recording the number of black pixel points in each mesh region, assigning the value 1 to the mesh region if the number of the black pixel points in the mesh region is greater than 0, otherwise, assigning the value 0 to the mesh region;
   S4, marking the image containing the QR code as a non-object region after values are assigned to the mesh regions;
   S5, scanning the non-object region from top to bottom line-by-line as well as from left to right column by column, marking the union of the mesh regions continuously with the value 1 for the first time in each line and the mesh regions continuously with the value 1 for the first time in each column as an object region, and marking the union of other regions as a non-object region;
   S6, recoding the number of mesh regions and the number of pixel points in the length direction of the object region, the number of mesh regions and the number of pixel points in the width direction of the object region and the number of mesh regions with the value 1 in the object region, and judging whether the object region is the QR code region or not;
   if the object region is not the QR code region, returning to step S5 to perform corresponding operation again;
   if the object region is the QR code region, outputting the line numbers and the column numbers of the pixel points corresponding to the boundaries of the object region.

2. The primary localization method for QR codes according to claim 1, characterized in that in step S5, the non-object region is scanned from top to bottom line-by-line and also scanned from left to right column by column, the union of the mesh regions continuously with the value 1 for the first time in each line and the mesh regions continuously with the value 1 for the first time in each column is marked as an object region, and the union of other mesh regions is marked as a non-object region, specifically,
   the non-object region is scanned from top to bottom line-by-line, and the mesh regions continuously with the value 1 for the first time in each line are marked as object regions;
   the first mesh region with the value 1 in each line is marked as an object line region, and the mesh region ahead of the first mesh region with the value 1 is marked as a non-object line region;
   if the mesh region ahead of the current mesh region is marked as an object line region and the value of the current mesh region is 1, the current mesh region is marked as a line object region, otherwise, the current mesh region is marked as a non-object line region;
   the non-object region is scanned from left to right column by column, and the mesh regions continuously with the value 1 for the first time in each column are marked as object regions;
   the first mesh region with the value 1 in each column is marked as an object column region, and the mesh region ahead of the first mesh region with the value 1 is marked as a non-object column region;
   if the mesh region ahead of the current mesh region is marked as an object column region and the value of the current mesh region is 1, the current mesh region is marked as an object column region, otherwise, the current mesh region is marked as a non-object column region;
   the union of the object line regions and the object column regions forms the object region.

3. The primary localization method for QR codes according to claim 1, characterized in that in step S6, whether the object region is the QR code region or not is judged, specifically,
   the number N of mesh regions with the value 1 in the object region is recorded;
   the number W of mesh regions and the number W*n of pixel points in the length direction of the object region are recorded;
   the number H of mesh regions and the number H*m of pixel points in the width direction of the object region are recorded;
   the pixel point difference threshold d is preset, if $N*2<W*H$ or $|(W*n)-(H*m)|>d$, it indicates that the object region is not the QR code region, otherwise, it indicates that the object region is the QR code region.

4. The primary localization method for QR codes according to claim 1, characterized in that in step S6, if the object region is the QR code region, whether the size of the object region meets the decoding condition or not is judged, specifically,
   the minimum pixel point threshold is preset, if the number of pixel points in the length direction of the object region is smaller than the minimum pixel point threshold, or the number of pixel points in the width direction of the object region is smaller than the minimum pixel point threshold, it indicates that the object region is too small and does not meet the decoding condition.

5. The primary localization method for QR codes according to claim 4, characterized in that the minimum pixel point threshold is 21.

6. The primary localization method for QR codes according to claim 1, characterized in that in step S6, if the object region is the QR code region, the line numbers and the column numbers of the pixel points corresponding to the boundaries of the object region are output, specifically,
   the line numbers and the column numbers of the mesh regions in the object region are recorded;
   according to the line numbers and the column numbers of the mesh regions in the object region and the characteristic that each mesh region includes m*n pixel points, the line numbers and the column numbers of the pixel points corresponding to the boundaries of the object region are obtained through calculation.

7. A primary localization system for QR codes, characterized by comprising a binarization module, a partition module, a first recording module, an assignment module, a first marking module, a scanning module, a second marking module, a second recording module, a judgment module and an output module, wherein, the binarization module is used for binarizing the pixel points of a received image containing a QR code;

the partition module is used for partitioning the received image containing the QR code into at least one mesh region including m*n pixel points;

the first recording module is used for recoding the number of black points in each mesh region;

the assignment module is used for assigning the value 1 or 0 to the mesh regions;

the first marking module is used for marking the image containing the QR code as a non-object region after the values are assigned to the mesh regions;

the scanning module is used for scanning the non-object region from top to bottom line-by-line and scanning the non-object region from left to right column by column;

the second marking module is used for marking the union of the mesh regions continuously with the value 1 for the first time in each line and the mesh regions continuously with the value 1 for the first time in each column as an object region and marking the union of other regions as a non-object region;

the second recording module is used for recording the number of mesh regions and the number of pixel points in the length direction of the object region, the number of mesh regions and the number of pixel points in the width direction of the object region and the number of mesh regions with the value 1 in the object region;

the judgment module is used for judging whether the object region is the QR code region or not;

the output module is used for outputting the line numbers and the column numbers of the pixel points corresponding to the boundaries of the object region.

\* \* \* \* \*